United States Patent

Busse et al.

[15] 3,684,092
[45] Aug. 15, 1972

[54] SLUDGE THICKENER AND METHOD

[72] Inventors: Oswald Busse; Hugo Klesper, both of Michelbach, Germany

[73] Assignee: Passavant-Werke, Michelbacher Hutte, Germany

[22] Filed: Feb. 24, 1970

[21] Appl. No.: 13,625

[30] Foreign Application Priority Data

March 4, 1969 Germany..........P 19 11 007.7

[52] U.S. Cl. .....................210/73, 210/83, 210/201, 210/252, 210/513
[51] Int. Cl. ...........................................B01d 21/00
[58] Field of Search........210/10, 67, 73, 83, 96, 201, 210/252, 259, 294, 534, 513

[56] References Cited

UNITED STATES PATENTS

| | | | |
|---|---|---|---|
| 3,036,713 | 5/1962 | Lambeth | 210/73 X |
| 3,252,896 | 5/1966 | Albertson | 210/10 X |
| 1,140,131 | 5/1915 | Dorr | 210/83 |
| 3,259,566 | 7/1966 | Torpey | 210/10 |
| 2,348,125 | 5/1944 | Green | 210/294 X |
| 2,850,449 | 9/1958 | Torpey | 210/10 |

FOREIGN PATENTS OR APPLICATIONS 808,906 2/1959 Great Britain...............210/10

OTHER PUBLICATIONS

Dorr Thickeners, The Dorr Company, Engineers, Stamford, Conn., 1951, pages 2–5, 16–21.

*Primary Examiner*—Reuben Friedman
*Assistant Examiner*—Thomas G. Wyse
*Attorney*—Larson, Taylor and Hinds

[57] ABSTRACT

The invention relates to a system for the thickening of sludges, in particular domestic sewage or industrial waste sludges. The system comprises two or more consecutively arranged thickening stages each consisting of one thickening tank or several parallel thickening tanks, and wherein the ratio of the largest inside diameter to the mean sludge level is larger than 1:1 in the first tank and smaller than 1:1 in the second tank relative to the direction of sludge flow.

17 Claims, 2 Drawing Figures

SLUDGE THICKENER AND METHOD

BACKGROUND OF THE INVENTION

This invention relates to sludge thickeners. Sludge thickeners are used to a large extent in municipal as well as industrial waste water treatment plants for dewatering sludges resulting, for example, in settling tanks and from wet cleaning or mineral raw material. A sludge thickener comprises a basin in which the water content of the sludges is reduced by sedimentation of solids. Stirring mechanisms are frequently applied to facilitate thickening and the removal of gases. After the sludge is thickened, it is subsequently treated to remove more water for example by natural dehydration on drying beds or by mechanical dewatering for instance in pressure filters.

The dewatering efficiency of a sludge thickening tank is moreover largely dependent on the ratio of the inside width of the tank or — in commonly used circular tanks — of the tank diameter, to the mean sludge level. In past years opinions differed as to the preference of low or high thickening tanks. It was found, however, that thickening efficiency is primarily dependent on the load and deteriorates with increasing load. Accordingly, wide tanks i.e. those whose diameter by far exceeds the sludge level were preferred and thus are applied in all cases.

A serious disadvantage of all sludge thickeners, especially those with a high dewatering efficiency, is that the subsequent sludge treatment facilities (usually pressure filters) require an intermittent, batch-type withdrawal of the sludge from the sludge thickener. Even if the influent to the sludge thickener is constant, the sludge level changes due to batch withdrawal and the change in level is detrimental to the thickening effect. Most importantly, in intermittent withdrawal, there is always the risk that the considerably thickened and viscous sludge cannot flow rapidly enough towards the outlet and the supernatant liquor or slurry breaks like a funnel through the sludge into the outlet. Thus, large sludge volumes with unduly high water content are withdrawn and extra load is put on the subsequent treatment plant. By arranging a funnel-shaped sludge sump at the bottom of a thickening basin and by installing a sludge scraping mechanism, this problem can only partly be resolved. These measures are generally insufficient and particularly in thickening tanks with high densifying efficiency.

BRIEF SUMMARY OF THE PRESENT INVENTION

In order to resolve the foregoing problems in a sludge treatment plant of the previously described type, there is provided according to the invention a multi-stage system wherein the ratio of the largest inside width to the mean sludge level is greater than 1:1 in a tank of a first stage and smaller than 1:1 in a tank of a subsequent stage or at least in the last thickening stage relative to the direction of sludge flow. Thereby, the advantages of the wide thickening basin with low surface loading are fully exploited in the first stage, whereas in the second stage the considerably thickened sludge is treated in tall thickening tanks where it is exposed to high compression pressure, the sludge column being so high that intermittent withdrawal will not cause the water to break in. It is particularly useful to keep the said ratio between 1:5 to 1:2 in the second thickening stage according to the invention.

DETAILED DESCRIPTION OF THE INVENTION

Figure 1:
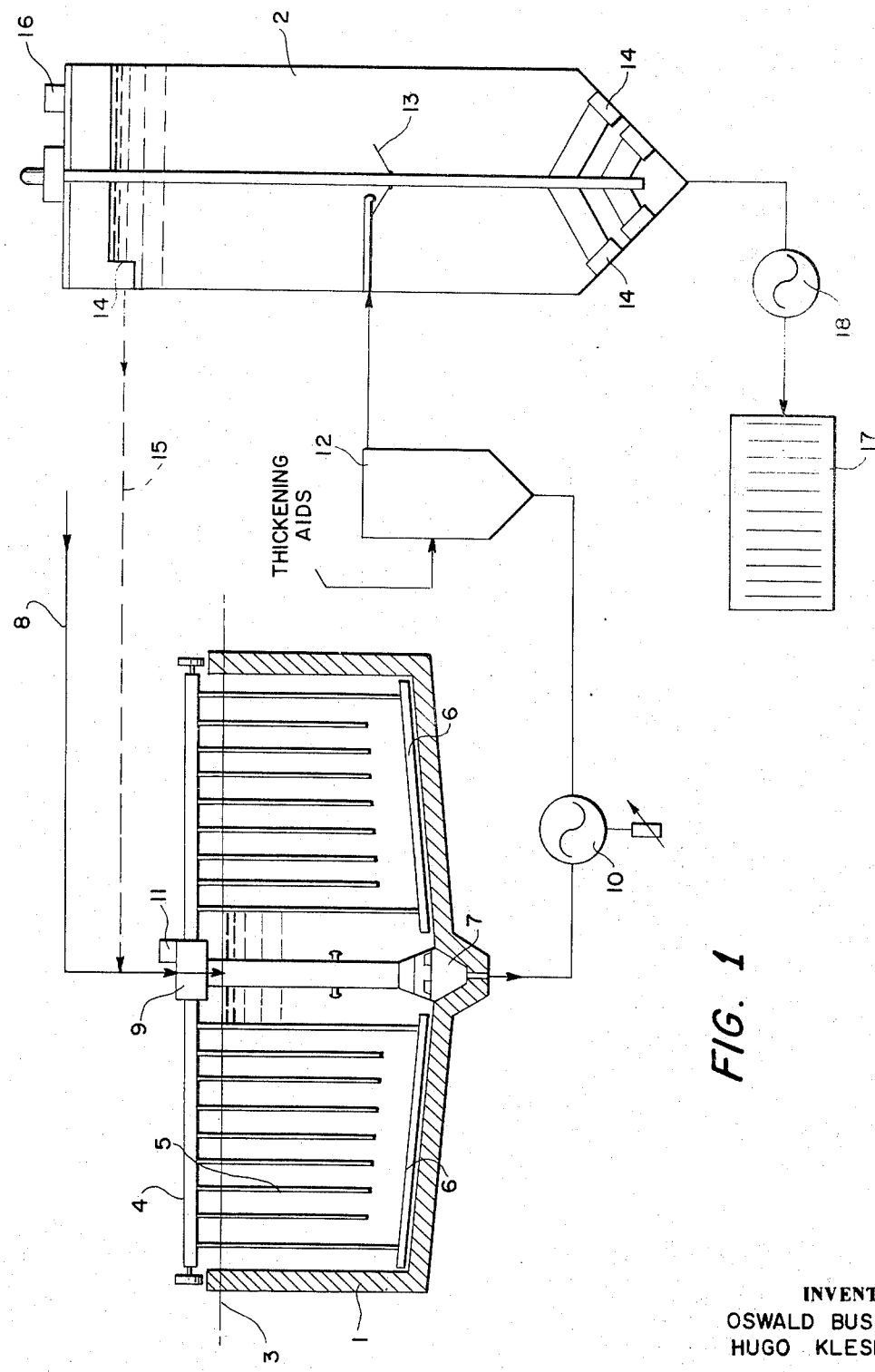
Figure 2:
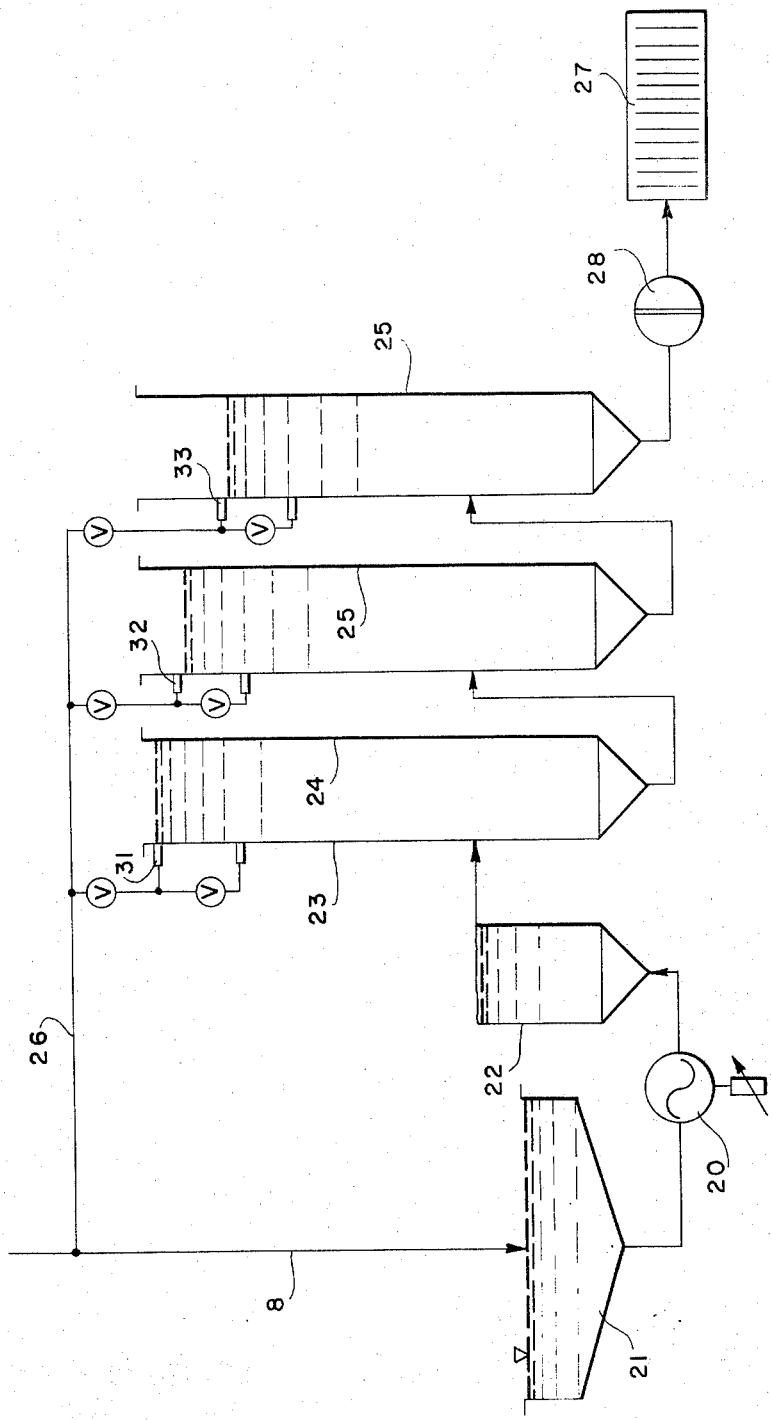

Preferred embodiments of the invention are included in the following detailed description including the drawings in which:

FIGS. 1 and 2 are diagrammatic views of sludge thickening systems according to the invention.

The two-stage thickener plant shown in FIG. 1 comprises two consecutively arranged thickener tanks 1 and 2. Thickener tank 1 of the first stage is of the conventional, flat design type, its diameter amounts to at least twice the normal sludge level 3. Thus, the load on the thickener floor is kept low. A scraper bridge 4 traveling on top of the cylindrical tank wall carries a stirring device 5 consisting of rabble arms and a bottom scraper mechanism 6 for conveying the sludge towards a funnel-shaped sludge sump 7. The height of the sludge sump is about 1 to 2 meters. The sludge conveyed by conventional conveying means is fed through inlet conduit 8 into the thickening tank 1 via a conventional inlet distributor 9. The separated water is removed by suitable overflow means (not shown) and the thickened sludge is withdrawn by a pump 10 the delivery of which is regulated by a control device 11 which is actuated by the torque opposing the stirring device 5. The sludge level in tank 1 is thus kept constant. Pump 10 has a constant delivery independent of the torque-dependent control ensuring a substantially constant withdrawal of sludge from tank 1.

Thickening aids such as weighting minerals, e.g., ash, or chemicals influencing the sludge consistency such as ferric chloride or aluminum chloride, lime, waste acid or polyelectrolytes, can be added in a mixing tank 12, e.g. a mixing cyclone.

The sludge from tank 1 is then fed into the tank 2 of the second stage which is of the high design type, i.e. its diameter is only a fraction, e.g. one-half to one-fifth, of the sludge level. The sludge is introduced into this tank 2 intermediate the top and bottom thereof at approximately midway therebetween via a centrally arranged distributor 13 assuring even distribution of the relatively viscous sludge and eliminating flow irregularities. Tank 2 is also equipped with a bottom scraper blade 14. A stirring mechanism can usually be dispensed with because the high sludge column in this tank exerts a heavy compression pressure. The separated water is discharged via an overflow weir arrangement 14 and returned via pipe 15 into the influent to tank 1. The amount of sludge introduced into tank 2, and thus the height of the thickened sludge in tank 2, is conveniently controlled by a torque-dependent control 16 which regulates pump 10. Alternatively, the control 16 can comprise a liquid level device to actuate a valve blocking sludge introduced to distributor 13.

The second thickening stage is followed by a pressure filter 17 for dewatering of the sludge; a pump 18 charges the filter in intermittent operation.

FIG. 2 shows the plant with the thickener tank 21 of the first stage in which the diameter-sludge level ratio is also very large. The stirring mechanism, scraping device, and feed well are omitted in this drawing for simplicity. The partially thickened sludge is withdrawn from the sludge hopper of tank 21 by a pump 20 and conveyed via the mixing tank 22 into the second thickening stage. This second stage consists of 3 consecutively arranged thickening tanks 23, 24, 25 which are very high relative to their diameter. These thickening tanks of the second stage are suitably made of plastic tubes in vertical juxtaposition. The plastic tubes can also be arranged in groups. The tanks of the second thickening stage are so arranged in consecutive order that the sludge withdrawn from the funnel-shaped sludge sump of the foremost tank is fed into the following tank at a point approximately midway between the top and bottom of same. From the last tank 25, the sludge is conveyed into the pressure filter 27. The overflow means 31, 32, 33 of the second stage thickener tanks are so arranged that the sludge level gradually decreases from one tank to the next and the sludge is fed from tank 23 into tank 24 and from tank 24 into tank 25 by hydrostatic pressure only. The sludge withdrawn from the overflow is returned via pipe 26 into the influent conduit 8 of the first thickening stage.

Significant advantages are achieved by the present invention if a conveyer system is provided ensuring a substantially continuous withdrawal of the thickened sludge from the first thickening stage. In this way, the sludge level, hydrostatic conditions, flow conditions, and similar factors influencing the thickening effect of the first stage can be kept constant regardless of the operation and intermittent charging of a subsequent sludge treatment plant. In particular, it is possible to avoid sludge withdrawal peaks in the first stage thus eliminating penetration of water to which this stage is prone because of the relatively low sludge level. It is useful to provide control devices which regulate the sludge inlet and/or outlet of the first thickening stage in order to maintain a constant sludge level in the first thickening stage. These devices which are intended for controlling the actual level of the sludge layer and not primarily that of the supernatant liquor, are preferably actuated by a measuring device which measures the torque acting upon a stirring and/or scraping mechanism which operates within the sludge.

Because of the intermittent discharge and feed-in of sludge into a pressure filter or similar system, fluctuations of the sludge level in the thickening tank of the second stage cannot be avoided. These fluctuations, however, are not decisive because of the considerably higher absolute sludge level. Also in this case, it will of course be attempted to keep the conditions as constant as possible. It is expedient to provide control devices particularly in the second stage regulating the sludge influent or water discharge so as to prevent exceeding the maximum sludge level. This can either be achieved by installation of a level control switch blocking the sludge influent or by providing an overflow arrangement in the second thickening stage to convey overflow to the influent of the first thickening stage.

The sludge leaving the first thickening stage and entering the second is already quite dense, therefore it is preferred to feed the sludge into a zone of the second thickening stage where approximately the same conditions prevail. According to a preferred feature of the present invention, the sludge effluent pipe discharges into the second thickening stage in medium water depth. It is also preferable that the sludge pipe discharges via inlet distributors into the second thickening stage, thus even distribution is ensured and irregular flow is eliminated.

Excellent results have been obtained where the second stage comprises a circular basin 6 to 9 meters high, preferably 8 meters high, and 3 to 5 meters, preferably 4 meters, in diameter. The second or at least the last thickening stage respectively preferably comprises several individual tanks parallel to each other and consisting of vertically disposed plastic tubes rather than one single basin. In that case the diameter—sludge level ratio according to the invention — is applicable to each individual tank. This results in a particularly simple and inexpensive construction of thickening tanks as plastic tubes are manufactured in mass production.

A method for operating a two-stage or multiple-stage sludge thickening plant of the said type according to the invention comprises intermittent withdrawal of sludge from the second or last thickening stage respectively, thus ensuring the maintenance of a substantially continuous sludge removal from the first thickening stage.

The system according to the invention furthermore offers the possibility of admixing the sludge with thickening aids, in particular weighting minerals such as ash and/or chemicals which influence the consistency of the sludge. Such additives are preferably dosed between the first and the second thickening stage as they are particularly desirable in the second thickening stage.

What is claimed is:

1. Apparatus for thickening sludges comprising: a first stage comprising a first thickening tank including tank bottom scraper means for conveying sludge towards a bottom outlet, means for maintaining sludge introduced into said first tank at a level adjacent the top thereof, the ratio of the largest inside dimension of said first tank to its height up to said sludge level therein being greater than 1:1; and a second stage comprising a second thickening tank including tank bottom scraper means for conveying sludge towards the bottom outlet, means for regulating sludge introduced into said second tank at a level adjacent the top thereof, the ratio of the largest inside dimension of said second tank to its height up to said sludge level being less than 1:1 and sufficiently low such that the tendency for supernatant liquor above the sludge in said second tank to break through into the sludge outlet upon withdrawal of sludge from said second tank is substantially lessened relative to withdrawal of the sludge from said first tank; means for conveying untreated sludge to said first tank, means for conveying thichkened sludge from said first tank to said second tank, and means for intermittently removing thickened sludge from said second tank.

2. Apparatus according to claim 1 wherein said first and second tanks are cylindrical, and the ratio of the diameter of the first tank to its height up to said sludge level is greater than 2:1, and the ratio of the diameter of the second tank to its height up to said sludge level is between 1:5 and 1:2.

3. Apparatus according to claim 1 further including means for continuously conveying thickened sludge from said first tank to said second tank.

4. Apparatus according to claim 3 wherein said first tank further includes a stirring mechanism and said first sludge tank level maintaining means comprises measuring means responsive to torque acting upon said stirring mechanism.

5. Apparatus according to claim 1 wherein said sludge level regulating means comprises means to regulate the amount of sludge conveyed to said second tank.

6. Apparatus according to claim 5 wherein said sludge level regulating means is responsive to a torque dependent switch.

7. Apparatus according to claim 5 wherein said sludge level regulating means is responsive to a level-regulating switch.

8. Apparatus according to claim 1 further including means to convey liquid overflow from said second tank to said first tank.

9. Apparatus according to claim 1 further including sludge inlet means provided approximately midway between the top and bottom of said second tank to receive thickened sludge conveyed from the first tank to the second tank.

10. Apparatus according to claim 7 wherein said second tank includes a sludge distributor located centrally of said tank.

11. Apparatus according to claim 1 further including means for introducing thickening aids into the sludge conveyed from said first tank.

12. Apparatus according to claim 1 wherein said first thickening tank includes a funnel-shaped sludge sump.

13. Apparatus according to claim 2 wherein said second tank has a diameter of from 3 to 5 meters and a height of from b 6 to 9 meters.

14. Apparatus according to claim 1 wherein said second stage includes a plurality of said second tanks, and conduit means to convey sludge sequentially through said plurality of tanks.

15. Apparatus according to claim 14 wherein said second tanks are fabricated of plastic material.

16. A method of thickening a raw sludge comprising the steps of introducing a raw sludge in a first cylindrical settling zone, maintaining the depth of said sludge less than the diameter of said first cylindrical settling zone, removing thickened sludge from the bottom of said first zone, conveying said removed thickened sludge to a second cylindrical settling zone, maintaining the depth of said sludge sufficiently greater than the diameter of said second cylindrical settling zone such that the tendency for supernatant liquor above the sludge in said second tank to break through into the sludge outlet upon withdrawal of sludge from said tank is substantially lessened relative to withdrawal of the sludge from said first tank, and intermittently removing thickened sludge from the bottom of said second zone.

17. A method according to claim 16 wherein the thickened sludge is continuously removed from the first zone and intermittently removed from the second zone.

* * * * *